(12) United States Patent
Yao et al.

(10) Patent No.: US 9,208,777 B2
(45) Date of Patent: Dec. 8, 2015

(54) FEATURE SPACE TRANSFORMATION FOR PERSONALIZATION USING GENERALIZED I-VECTOR CLUSTERING

(71) Applicant: Microsoft Corporation, Redmond, WA (US)

(72) Inventors: Kaisheng Yao, Newcastle, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 13/750,870

(22) Filed: Jan. 25, 2013

(65) Prior Publication Data

US 2014/0214420 A1 Jul. 31, 2014

(51) Int. Cl.
*G10L 15/00* (2013.01)
*G10L 15/06* (2013.01)

(52) U.S. Cl.
CPC ....... *G10L 15/063* (2013.01); *G10L 2015/0635* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 5,835,893 A * | 11/1998 | Ushioda ........................ | 704/257 |
| 6,073,096 A | 6/2000 | Gao et al. | |
| 6,088,669 A | 7/2000 | Maes | |
| 6,442,519 B1 * | 8/2002 | Kanevsky et al. ............ | 704/243 |
| 6,574,597 B1 * | 6/2003 | Mohri et al. .................. | 704/251 |
| 7,031,917 B2 * | 4/2006 | Asano ........................... | 704/238 |
| 7,801,838 B2 | 9/2010 | Colbath et al. | |
| 8,046,224 B2 | 10/2011 | Rajput et al. | |
| 8,200,495 B2 | 6/2012 | Braho et al. | |
| 2008/0004876 A1 * | 1/2008 | He et al. ........................ | 704/243 |
| 2012/0271631 A1 * | 10/2012 | Weng et al. ................... | 704/243 |

OTHER PUBLICATIONS

Garcia-Romero et al. "Multicondition training of Gaussian PLDA models in i-vector space for noise and reverberation robust speaker recognition". In Proc. IEEE ICASSP, Kyoto, Japan, Mar. 2012, pp. 4257-4260.*

Pusateri, et al., "Rapid Speaker Adaptation Using Speaker Clustering", In 7th International Conference on Spoken Language Processing, Sep. 16, 2002, 4 pages.

(Continued)

*Primary Examiner* — Jesse Pullias
(74) *Attorney, Agent, or Firm* — Danielle Johnston-Holmes; Steven Spellman; Micky Minhas

(57) ABSTRACT

Personalization for Automatic Speech Recognition (ASR) is associated with a particular device. A generalized i-vector clustering method is used to train i-vector parameters on utterances received from a device and to classify test utterances from the same device. A sub-loading matrix and a residual noise term may be used when determining the personalization. A Universal Background Model (UBM) is trained using the utterances. The UBM is applied to obtain i-vectors of training utterances received from a device and a Gaussian Mixture Model (GMM) is trained using the i-vectors. During testing, the i-vector for each utterance received from the device is estimated using the device's UBM. The utterance is then assigned to the cluster with the closest centroid in the GMM. For each utterance, the i-vector and the residual noise estimation is performed. Hyperparameter estimation is also performed. The i-vector estimation and hyperparameter estimation are performed until convergence.

19 Claims, 9 Drawing Sheets

(56) References Cited

OTHER PUBLICATIONS

Dines, et al., "Personalizing Speech-to-Speech Translation: Unsupervised Cross-Lingual Speaker Adaptation for HMM-Based Speech Synthesis", In Conference on Computer Speech and Language, Jul. 8, 2011, 35 pages.

Li, et al., "Unsupervised Semantic Intent Discovery from Call Log Acoustics", In Conference on Acoustics, Speech, and Signal Processing, Mar. 18, 2005, 4 pages.

Herbig, et al., "Fast Adaptation of Speech and Speaker Characteristics for Enhanced Speech Recognition in Adverse Intelligent Environments", In Sixth International Conference on Intelligent Environments, Jul. 19, 2010, 6 pages.

Dehak, et al., "Front-End Factor Analysis for Speaker Verification", In IEEE Transactions on Audio, Speech, and Language Processing, vol. 19, Issue 4, May 2011, 11 pages.

Zhang, et al., "A New I-Vector Approach and its Application to Irrelevant Variability Normalization Based Acoustic Model Training", In IEEE International Workshop on Machine Learning for Signal Processing, Sep. 18, 2011, 6 pages.

Karafiat, et al, "iVector-Based Discriminative Adaptation for Automatic Speech Recognition", In IEEE Workshop on Automatic Speech Recognition and Understanding, Dec. 11, 2011, 6 pages.

* cited by examiner

Table 1

Table 2

FEATURE SPACE TRANSFORMATION FOR PERSONALIZATION USING GENERALIZED I-VECTOR CLUSTERING

BACKGROUND

Automatic Speech Recognition (ASR) is becoming more common in applications such as gaming, web search and other speech understanding systems. Many systems attempt to understand and adapt to different speakers using speaker personalization. Personalization of speech recognition is directed at adapting speech recognition to a specific user. The personalization may use different speaker adaptation techniques (e.g. compensate feature distortions, adjust speech recognition model parameters, and the like). Adapting for speaker variability can be challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Personalization for Automatic Speech Recognition (ASR) is associated with a particular device. A generalized i-vector clustering method is used to train i-vector parameters on utterances received from a device and to classify test utterances from the same device. The i-vector parameters may be trained using a few utterances that are received from the device. The i-vectors represent environment and speaker variability for the particular device. A sub-loading matrix and a residual noise term may be used when determining the personalization. A Universal Background Model (UBM) is trained using the utterances. The UBM is applied to obtain i-vectors of training utterances received from a device and a Gaussian Mixture Model (GMM) is trained using the i-vectors. During testing, the i-vector for each utterance received from the device is estimated using the device's UBM. The utterance is then assigned to the cluster with the closest centroid in the GMM. For each utterance, the i-vector and the residual noise estimation is performed. Hyperparameter estimation is also performed. The i-vector estimation and hyperparameter estimation are performed until convergence.

DETAILED DESCRIPTION

Figure 1:
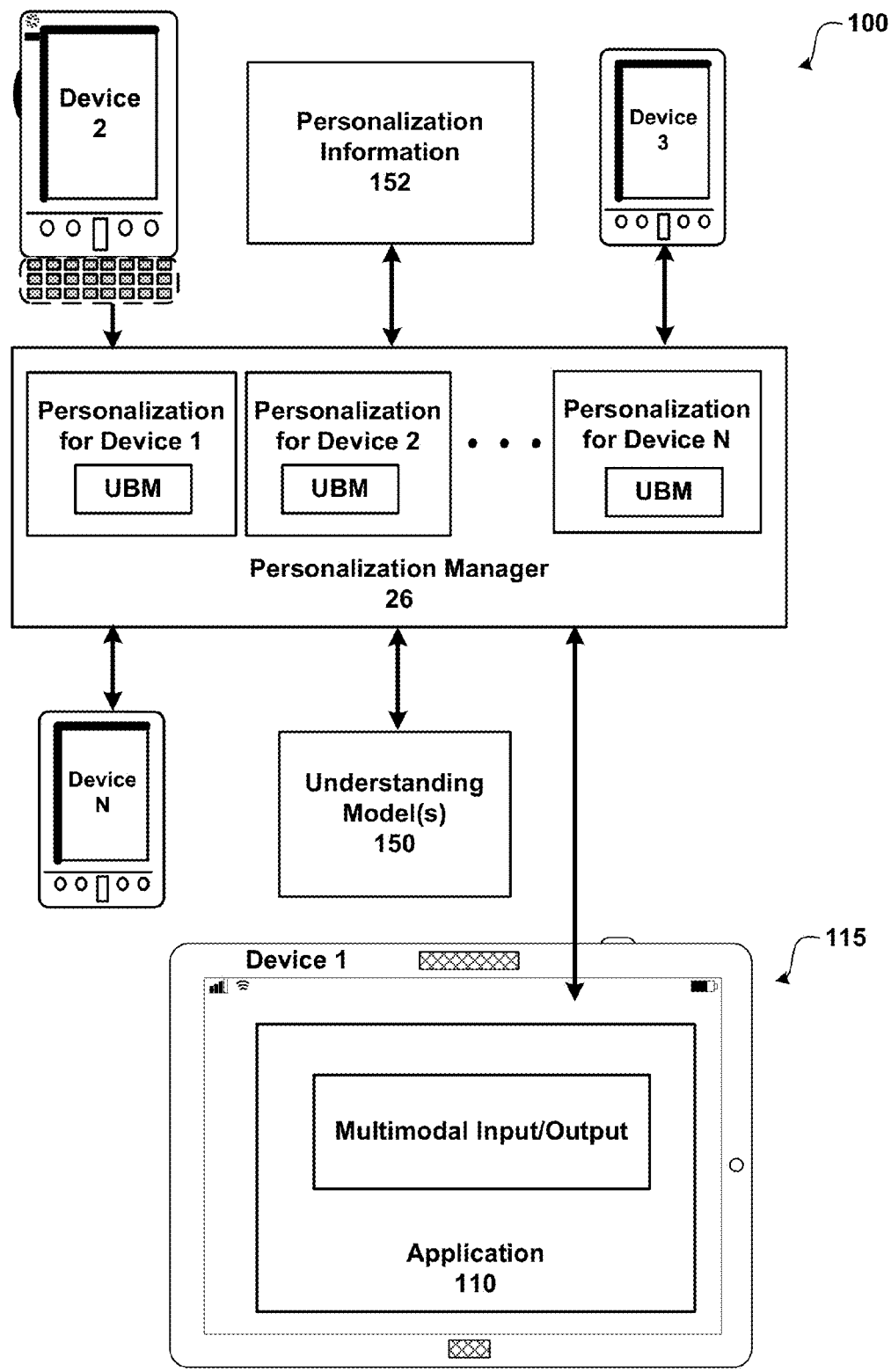
FIG. 1 shows a system for personalization for different devices within a speech recognition system.

Referring now to the drawings, in which like numerals represent like elements, various embodiment will be described.

FIG. 1 shows a system for personalization for different devices within a speech recognition system. As illustrated, system 100 includes personalization manager 26, understanding model(s) 150, personalization information 152, devices 1-N, application 110 and touch screen input device/display 115.

In order to facilitate communication with the personalization manager 26, one or more callback routines, may be implemented. According to one embodiment, application program 110 is a multimodal application that is configured to receive speech input and input from a touch-sensitive input device 115 and/or other input devices. For example, voice input, keyboard input (e.g. a physical keyboard and/or SIP), video based input, and the like. Application program 110 may also provide multimodal output (e.g. speech, graphics, vibrations, sounds, . . . ). Personalization manager 26 may provide information to/from application 110 in response to user input (e.g. speech/gesture). For example, a user may say a phrase to identify a task to perform by application 110 (e.g. selecting a movie, buying an item, identifying a product, . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

A natural user interface (NUI) and/or some other interfaces may be used to interact with a system. For example, a combination of a natural language dialog and other non-verbal modalities of expressing intent (gestures, touch, gaze, images/videos, spoken prosody, etc.) may be used to interact with the application/service. Personalization manager 26 and/or some other component of a speech recognition system may use an understanding model (e.g. a Spoken Language Understanding (SLU) model and/or multimodal understanding model such as understanding models 150). Personalization manager 26 may be part of a dialog system that receives speech utterances and is configured to personalize an acoustic model for speech recognition for different devices (e.g. devices 1-N).

Automatic speech recognition (ASR) may be used as a component for many different applications, such as mobile applications (e.g. web search, speech understanding, and games). For example, application 110 may be associated with an ASR. In many instances, a device is typically used by a single user in a particular environment. The device (e.g. 115), however, may be used by other people, for example other family members. The device may also be used in different acoustic environments, for example cars, streets or family rooms, where large acoustic variations exist.

ASR is sensitive to mismatches of training and testing. Personalization is an idea to reduce such mismatch by adapting the ASR associated to a device to a particular user. Usually, personalization uses methods such as speaker adaptation, feature transformation, language model adaptation, etc.

Recently, an i-vector based method has been proposed for acoustic model training and speaker adaptation. In the i-vector framework, a Gaussian mixture model (GMM) is trained with K Gaussian components. Denote the k-th Gaussian component mean vector as $\mu_k(0) \in R^D$. Given observation sequence $x_t$s of an utterance s, mean vectors of this GMM are adapted. Using a super-vector $\mu(s)=[\mu_1(s)T \ldots \mu_K(s)^T]^T$ to represent a concatenation of these mean vectors, this super-vector is related to the super-vector of the original GMM mean vectors, $\mu(0)=[\mu_1(0)T \ldots \mu_K(0)^T]^T$ as follows:

$$\mu(s)=\mu(0)+Tw(s) \quad \text{(Equation 1)}$$

where $T \in R^{KD \times d}$ is a loading matrix. $w(s) \in R^d$ is the i-vector of this utterance and it has a priori distribution of $N(\cdot; 0, I)$. d is the i-vector dimension.

Personalization manager 26 uses a method for personalization using i-vector based feature space transformation. Personalization manager 26 uses a generalization of i-vector extraction that includes tying of sub-loading matrices and residual noise. The generalization assists in determining impacts of i-vector parameters on likelihood improvements and clustering. The generalization may also lead to a small size of i-vector parameters (e.g. tying). Different from other i-vector based methods, personalization manager 26 trains i-vector parameters using the utterances obtained from a particular device and may exclude other utterances. According to an embodiment, the utterances received from a specific device are the utterances used to determine the personalization for the device while utterances from other devices are excluded. For example, utterances from device 1 are used to for a first personalization (e.g. Personalization for Device 1), utterances received from device 2 are used for a second personalization (e.g. Personalization for Device 2), and the like. Personalization information 152 may be stored in one or more locations (e.g. on the device being personalized, a network data store, and the like). It has been found that this method performed by personalization manager 26 produces small number of i-vector parameters. The extracted i-vectors determined by personalization manager 26 represent environment and speaker variability in a particular device.

Personalization manager 26 may train the i-vector parameters using a few utterances, as compared to using a lot of utterances, that are received from a specific device. Personalization manager 26 may use a sub-loading matrix and a residual noise term may be used when determining the personalization. According to an embodiment, personalization manager 26 trains a Universal Background Model (UBM) using the utterances received from the device and excludes other utterances from the UBM. Personalization manager 26 applies the UBM to obtain i-vectors of training utterances received from a device and trains a Gaussian Mixture Model (GMM) using the i-vectors. At test time, each utterance received from the device is used by personalization manager 26 to estimate the i-vector using the device's associated UBM. Personalization manager 26 assigns the utterance to the cluster with the closest centroid in the GMM. For each utterance, the i-vector and the residual noise estimation is performed. Hyperparameter estimation is also performed by personalization manager 26. The i-vector estimation and hyperparameter estimation are performed by personalization manager 26 until convergence. More information is provided below.

Figure 2:
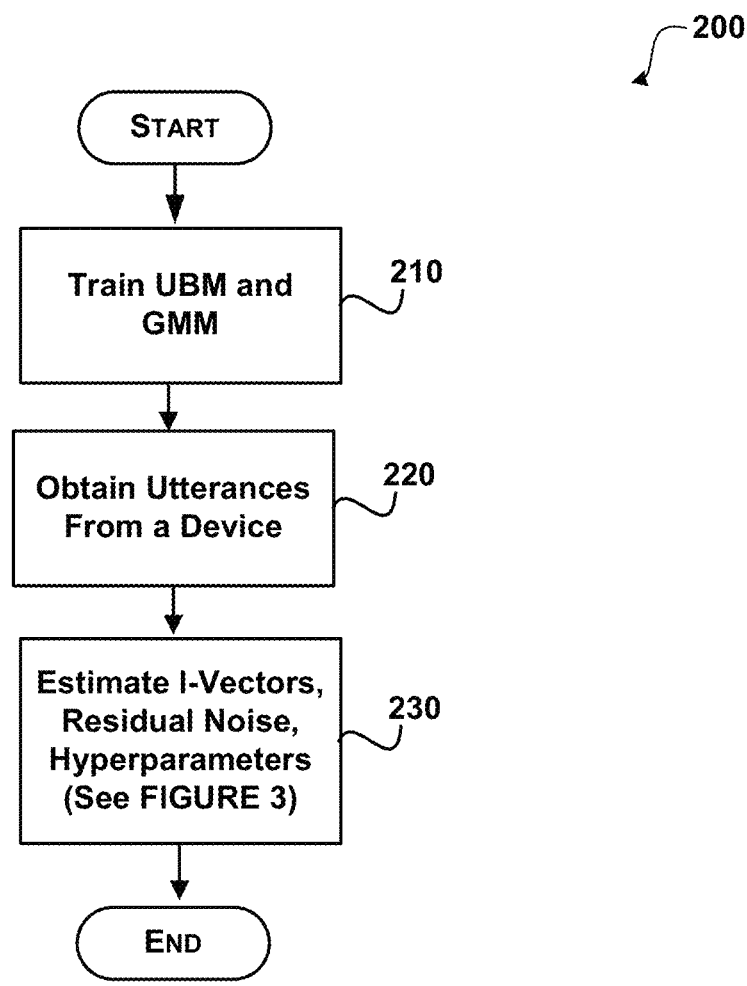
FIG. 2 shows a process for device-specific personalization using i-vectors to train a UBM and a GMM.
Figure 3:
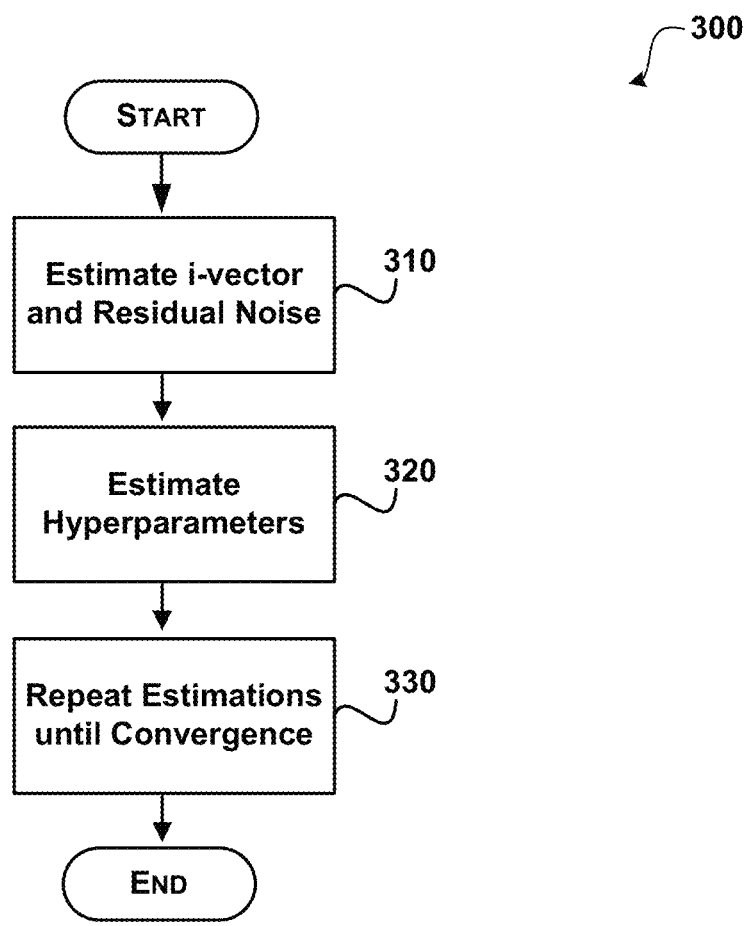
FIG. 3 shows a process for estimating i-vectors and hyperparameters.

FIGS. 2 and 3 illustrate processes associated with speech recognition acoustic personalization for different devices. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 2 shows a process for device-specific personalization using i-vectors to train a UBM and a GMM.

After a start operation, the process moves to operation 210, where a Universal Background Model (UBM) and GMM are trained. At a high level, the UBM for the device is applied to the to obtain i-vectors of training utterances from a device and then train a GMM on these i-vectors. At test time, an estimate i-vector of an utterance from the device using its UBM is determined and then the utterance is assigned to the cluster with the closest centroid in the GMM. According to an embodiment, the UBM is trained using utterances just received from the device. The GMM is trained using the i-vectors based on the training utterances. For purposes of explanation, assume that environment and speaker variability may be compensated via constrained maximum likelihood linear regression (CMLLR) feature transform $$\hat{x}=Ax_t+b=W\xi_t \quad \text{(Equation 2)}$$

where W=[b;A]. b is a bias vector and A is a rotation/scaling matrix. $\xi_t=[1 x_t^T]^T$ is the augmented observation vector at time t. According to an embodiment, assume that each utterance has a particular environment and speaker variability. The above transform could be cluster-dependent.

The cluster-dependent transform $W^{(c)}$ is estimated by maximizing a cluster-dependent auxiliary score $$Q(W^{(c)}) = \beta^{(c)} \log|A^{(c)}| + tr(K^{(c)T} W^{(c)}) - \frac{1}{2}\sum_i r_i^{(c)T} G_i^{(c)} r_i^{(c)} \quad \text{(Equation 3)}$$

where the column vector $r_i^{(c)}$ corresponds to the i-th row of $W^{(c)}$. $\beta^{(c)}$, $K^{(c)}$, and $G_i^{(c)}$ are respectively cluster-dependent count, first order and second order statistics for CMLLR.

The following is used to cluster utterances originated from a device.

Assume that $x_t$ in a training set follows a distribution that is modeled by a universal background model (UBM). This UBM is represented as a GMM $U \sim \{c_k N(\cdot; \mu_k(0), \Sigma_k(0)): k=1, \ldots, K\}$, where $c_k, \mu_k(0), \Sigma_k(0)$ each denote mixture weight, mean vector and (diagonal) covariance matrix of component k. According to an embodiment, the UBM is trained using data just from a device in interest.

Now assume that each utterance on a new set of data has its own distribution as $$x_t(s) \sim \Sigma_k c_k N(\cdot; \mu_k(s), \Sigma_k(0))$$ (Equation 4).

That is, observations of the s-th utterance have their mean vectors, though they share the same weights and covariance matrices as those in the UBM U. The mean vector of a component k $\mu k(s)$ is adapted from its original mean vector $\mu k(0)$. They are related as follows:

$$\mu_k(s) = \mu_k(0) + T_k w(s) + \epsilon_k(s)$$ (Equation 5)

where $T_k \in R^{D \times d}$ is the k-th sub-loading matrix for Gaussian component k. w(s), as described by Equation, is the i-vector of utterance s. The i-vector dimension d is usually smaller than observation feature dimension D. The residual noise term $\epsilon_k(s) \in R^D \sim N(\cdot; 0, \Psi_k)$ represents modeling error. $\Psi_k$ is a D×D diagonal matrix.

Introducing the sub-loading matrix $T_k$ and the residual noise term $\epsilon_k(s)$ a generalization is made as follows: Define r(k) as a regression class index of subloading matrices $\{T_k: k=1, \ldots, K\}$. The total number of regression classes is denoted as M. Sub-loading matrices tying as follows:

$$\mu_k(s) = \mu_k(0) + T_{r(k)} w(s) + \epsilon_k(s)$$ (Equation 6)

where $T_{r(k)} \in R^{D \times d}$ now is a tied sub-loading matrix that is shared with other Gaussian components belonging to the same regression class r(k). Notice that $\epsilon_k(s)$ is kept from tying.

The particular tying of sub-loading matrices may be intuitive. For example, a group of Gaussian components may represent silence and the other may represent speech. Therefore, two regression classes may be chosen for noise and speech.

Moving to operation 220, utterances from a device is received. The utterances received are from a specific device for which a personalization is being created.

Flowing to operation 230, estimations are performed. To train the UBM, an estimation is performed to estimate i-vectors, residual noise and hyperparameters based on each utterance. The estimation process is repeated until convergence (See FIG. 3 and related discussion).

The process the moves to an end block and returns to processing other actions.

FIG. 3 shows a process for estimating i-vectors and hyperparameters.

After a start operation, the process flows to operation 310, estimation for i-vector is performed. According to an embodiment, to estimate i-vector and residual noise for an utterance s, the following function is maximized:

$$Q(w(s)) \propto -\frac{1}{2} \sum_{k=1}^{K} \sum_t \gamma_k^{(s)}(t)(x_t - u_k(s))^T \sum_k^{-1} (x_t - \mu_k(s)) -$$ (Equation 7)

$$\frac{1}{2} w(s)^T w(s) - \frac{1}{2} \sum_k \epsilon_k(s)^T \Psi_k^{-1} \epsilon_k(s) \propto$$

$$\sum_k p_k(s)^T \sum_k^{-1} (T_{r(k)} w(s) + \epsilon_k(s)) -$$

$$\frac{1}{2} \sum_k \beta_k(s) q_k^T(s) \sum_k^{-1} q_k(s) -$$

$$\frac{1}{2} w(s)^T w(s) - \frac{1}{2} \sum_k \epsilon_k(s)^T \Psi_k^{-1} \epsilon_k(s)$$

where $\beta_k(s) = \Sigma_t \gamma_k^{(s)}(t) \epsilon_k(s) \in R^D$ is the k-th subvector of $\epsilon(s)$. $p_k(s)$ and $q_k(s)$ each are defined as follows:

$$p_k(s) = \Sigma_t \gamma_k^{(s)}(t)(x_t(s) - \mu_k(0))$$ (Equation 8)

$$q_k(s) = T_{r(k)} w(s) + \epsilon_k(s)$$ (Equation 9)

Differentiating Eq. (7) with respect to $\epsilon_k(s)$ and equating the result to zero, $$\epsilon_k(s) = \Phi_k^{-1} \Sigma_k^{-1} (p_k(s) - \beta_k(s) T_{r(k)} w(s))$$ (Equation 10)

where $\Phi_k = \Psi_k^{-1} + \beta_k(s) \Sigma_k^{-1}$.

Substituting the estimated $\epsilon_k(s)$s to (7) and differentiating it with respect to w(s) to obtain the following estimate of w(s).

$$w(s) = \Xi^{-1} \Sigma_k T_{r(k)} \Sigma_k^{-1} (p_k(s) - \beta_k(s) \epsilon_k(s))$$ (Equation 11)

where $\Xi = I + \Sigma_k \beta_k(s) T_{r(k)}^T \Sigma_k^{-1} T_{r(k)}$. This process is iterated between estimating $\epsilon(s)$ and w(s).

Moving to operation 320, hyperparameters are estimated. According to an embodiment, to estimate hyperparameters T and $\Psi$, the following function is maximized:

$$Q(T, \Psi) =$$ (Equation 12)

$$-\frac{1}{2} \sum_{s,k,t} \gamma_k^{(s)}(t)(x_t(s) - \mu_k(s))^T \sum_k^{-1} (x_t(s) - \mu_k(s)) -$$

$$\frac{1}{2} w(s)^T w(s) - \frac{1}{2} \epsilon(s)^T \Psi^{-1} \epsilon(s) - \frac{S}{2} \log|\Psi|$$

where S is the number of training utterances. The following equation is solved to estimate $T_{r(k)}$ for each regression class l.

$$\Sigma_s \Sigma_{r(k)=l} \beta_k(s) w(s) w(s)^T T_{r(k)}^T = \Sigma_s w(s) \Sigma_{r(k)=l} (p_k(s) - \beta_k(s) \epsilon_k(s)^T$$ (Equation 13).

Differentiating (12) with respect to $\Psi$, shows the following estimate $$\Psi = \frac{1}{S} \sum_s \epsilon(s) \epsilon(s)^T.$$ (Equation 14)

According to an embodiment, residual noise is assumed to be uncorrelated and the diagonal elements of the above estimate are maintained.

Transitioning to operation 330, the estimations performed at operations 230 and 240 are repeated until convergence. Tying may be performed. As described, U and G are dominated by the loading matrix with its size of O(K×D×d). Tying can reduce its size to O(M×D×d) and the total number of regression classes M is usually smaller than K. Note that the standard i-vector representation in Eq. (1) is a special case of (6) that has unique regression classes for each sub-loading matrix and ignores residual noise.

The process the moves to an end block and returns to processing other actions.

Figure 4:
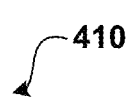
FIG. 4 shows exemplary results obtained from experiments using the personalization method using i-vectors determined from utterances received from a device.
Figure 4:
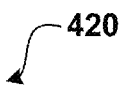

FIG. 4 shows exemplary results obtained from experiments using the personalization method using i-vectors determined from utterances received from a device.

The experimental results described herein are for explanation purposes and are not intended to be limiting. For the experiments, i-vector parameters were trained on a single speaker with 70 different utterances. Features were 39 dimension MFCCs, delta, and delta-delta. The UBM (U) used 4 Gaussian components. The i-vector dimension was set to 10. In each of the experiments, the initial value for elements of was set to 1e−5. A cosine distance was used for clustering.

Three setups were tested. Using the above description, it was observed that introducing residual noise does not change much of the log-likelihood. On the other hand, introducing tying, reduced log-likelihood. In this case, 4 Gaussians in UBM were split into 2 classes, each with 2 Gaussians. Their log likelihood scores versus iteration numbers are listed in Table 1 for details. Four Gaussian components GMM on i-vectors were trained for the three setups and observed no differences in their clustering results. Table 1 (410) in FIG. 4 shows log-likelihood scores (in 410) with different setups versus iteration numbers.

Table 2 (420) in FIG. 4 illustrates Word Error Rates (WERs). In an experiment, the SR task was a voice search using a MICROSOFT KINECT device. The scenario supports distant talking voice search (of music catalog, games, movies, etc.) using a microphone array. The data includes 20 hours of XBOX voice search commands for training and 2 hours for testing. Each device used in the training used 70 utterances. A Kaldi speech recognition toolkit was used to train ASR system. The features were 39-dimention MFCC, delta, and delta-delta coefficients. Per-device cepstral mean subtraction was applied and CMLLR used full transformations. Gender independent acoustic model had a maximum of 15k Gaussian components, first trained on maximum likelihood estimation (MLE) and then followed by maximum mutual information (MMI) and boosted MMI (bMMI) trainings bMMI used boosting factor of 0.1. The language model was trained with text from web queries and catalogue.

The test set included 25 devices that each had 70 utterances. The i-vector feature dimension was empirically set to 10. The clustering using the method described herein resulted in 2 to 4 components if set the minimum count per cluster to 10. Unsupervised CMLLR described above was applied in the following four cases. In the per utterance, or "per utt" case, CMLLR was applied per utterance without using statistics from other utterances in a device. In the case of per device, which corresponded to one cluster per device, CMLLR statistics were accumulated on each of the utterances from a device. CMLLR was then applied to those utterances from the device ("per dev 1cls"). In the case of per device 2 clusters, or "per dev 2cls", utterances from each device were classified into 2 clusters. The case of per device 4 clusters, or "per dev 4cls", had 4 clusters per device. CMLLR was then estimated for each cluster.

Reviewing Table 2 (420) in FIG. 4 shows the following.

In the MLE system, "per dev 1cls" reduced WERs in comparison to "per utt" by 15%. "per dev 2cls" and "per dev 4cls" each further reduced WERs by 7% and 10%.

In the MMI system, "per dev 1cls" reduced WERs in comparison to "per utt" by 17%. "per dev 2cls" and "per dev 4cls" each further reduced WERs by 10% and 4%.

In the bMMI system, "per dev 1cls" reduced WERs in comparison to "per utt" by 16%. "per dev 2cls" and "per dev 4cls" each further reduced WERs by 12% and 5%.

On MLE system, the largest word error rate reduction (WERR) was achieved using 4 clusters. OnMMI systems, the largest WERRs were achieved using 2 clusters.

The results appear to indicate that with better acoustic modeling using MMI and bMMI, an optimal number of clusters may be able to be reduced. The optimal number of clusters was reduced to 2 with MMI and bMMI models, from 4 with MLE acoustic models.

On a large vocabulary voice search task using an KINECT device, this approach implemented in experiments reduced WERs by 28% relative, in comparison to per utterance adaptation. This method may be expanded to subspace fMLLR, which may train cluster-specific basis.

Figure 5:
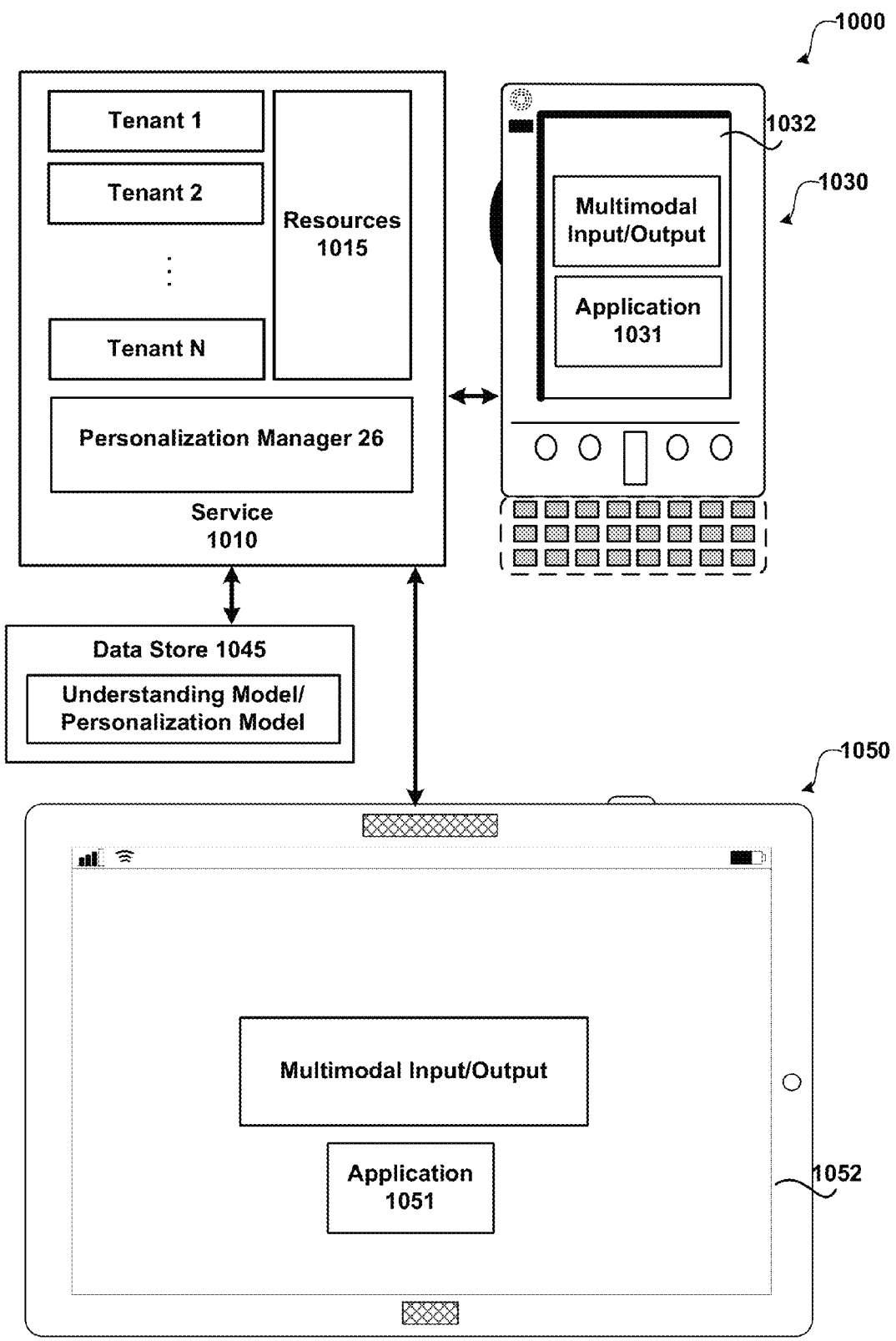
FIG. 5 illustrates an exemplary system for using a speech recognition system using per device acoustic modeling.

FIG. 5 illustrates an exemplary system for using a speech recognition system using per device acoustic modeling. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as multimodal services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with multimodal applications and each include a an application (1031, 1051).

As illustrated, touch screen input device/display 1050 and smart phone 1030 shows exemplary displays 1052/1032 showing the use of an application using multimodal input/output. Data may be stored on a device (e.g. smart phone 1030, slate 1050 and/or at some other location (e.g. network data store 1045). Data store 1054 may be used to store the central knowledge base. The applications used by the devices may be client based applications, server based applications, cloud based applications and/or some combination.

Personalization manager 26 is configured to perform operations relating to feature space transformation for personalization using generalized I-Vector clustering as described herein. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
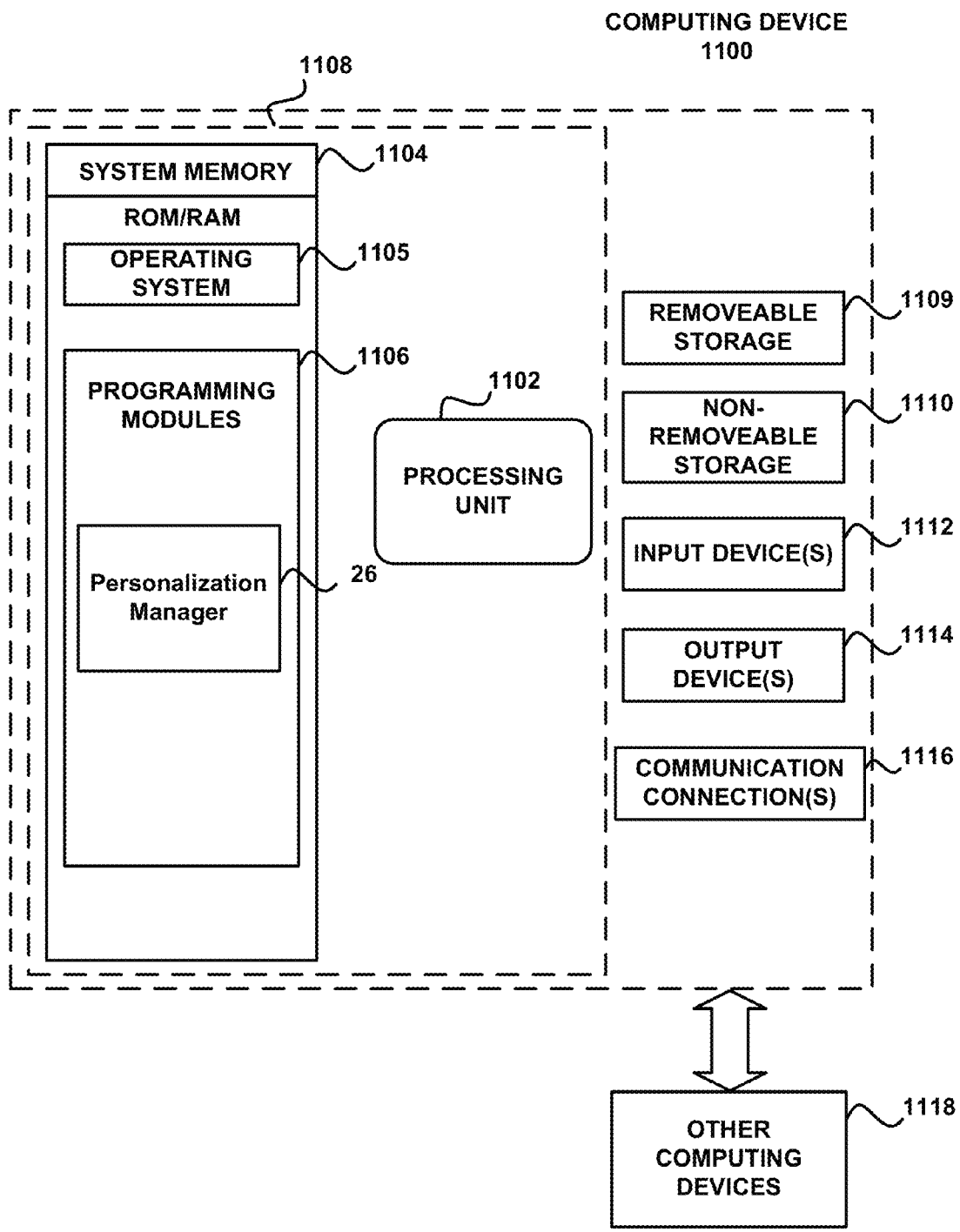
FIGS. 6-8 and the associated descriptions provide a discussion of a variety of operating environments in which embodiments of the invention may be practiced.
Figure 7A:
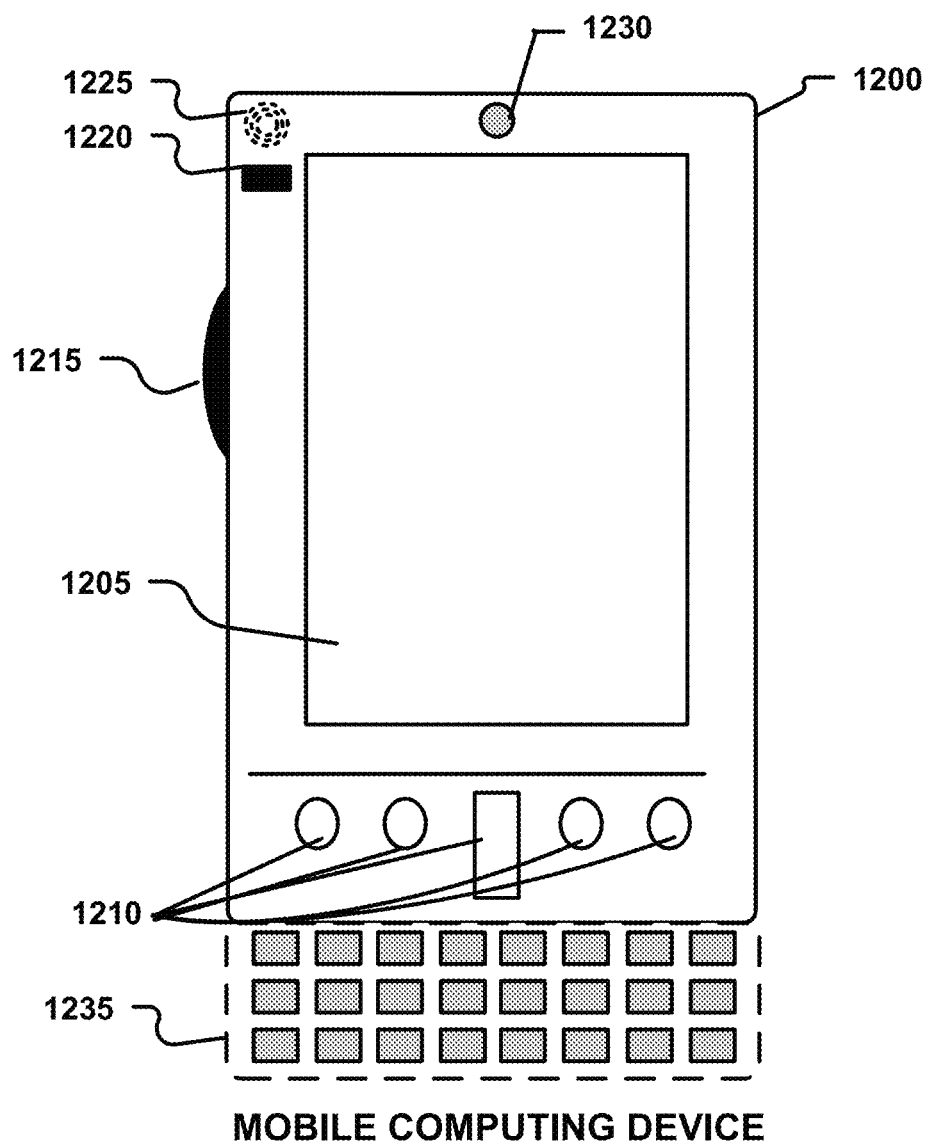
Figure 7B:
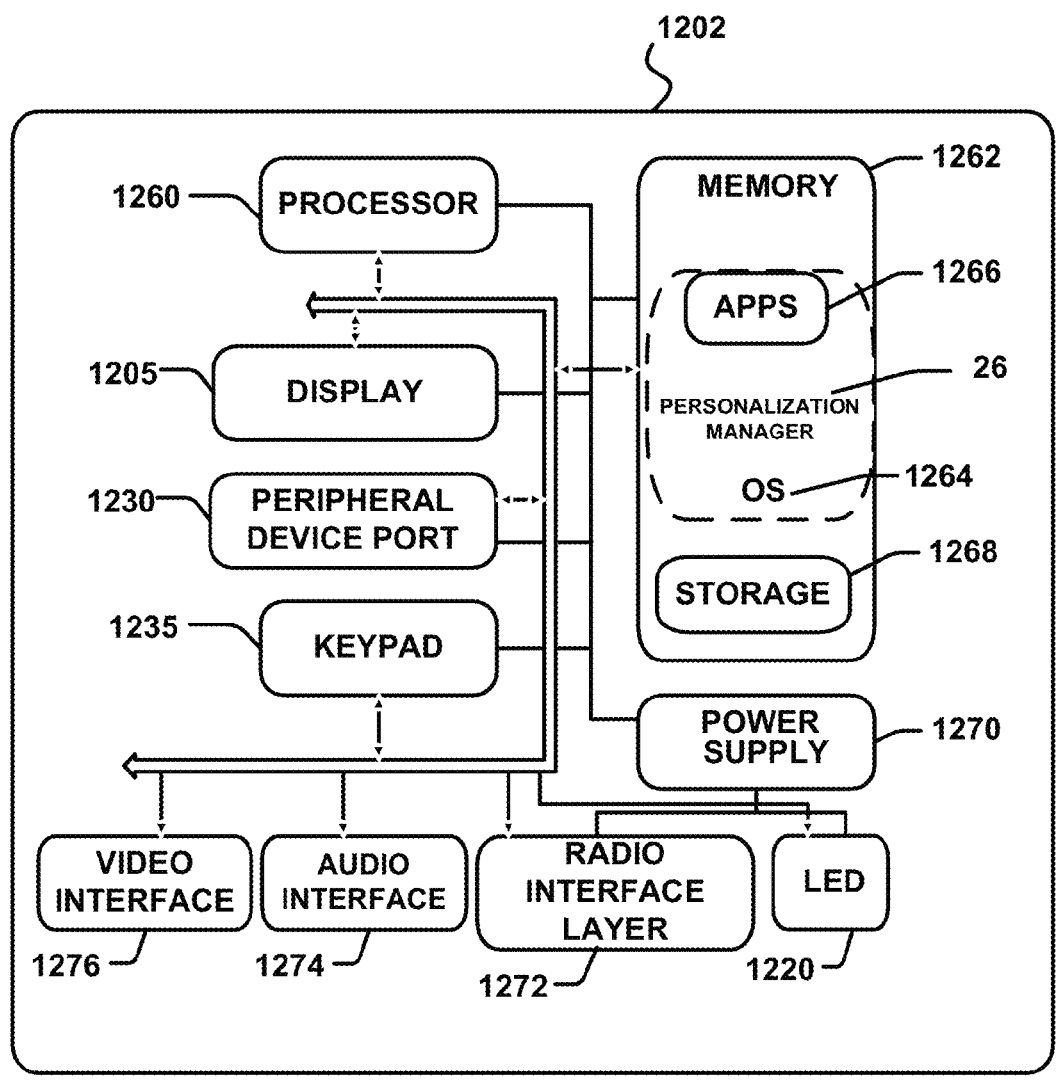
Figure 8:
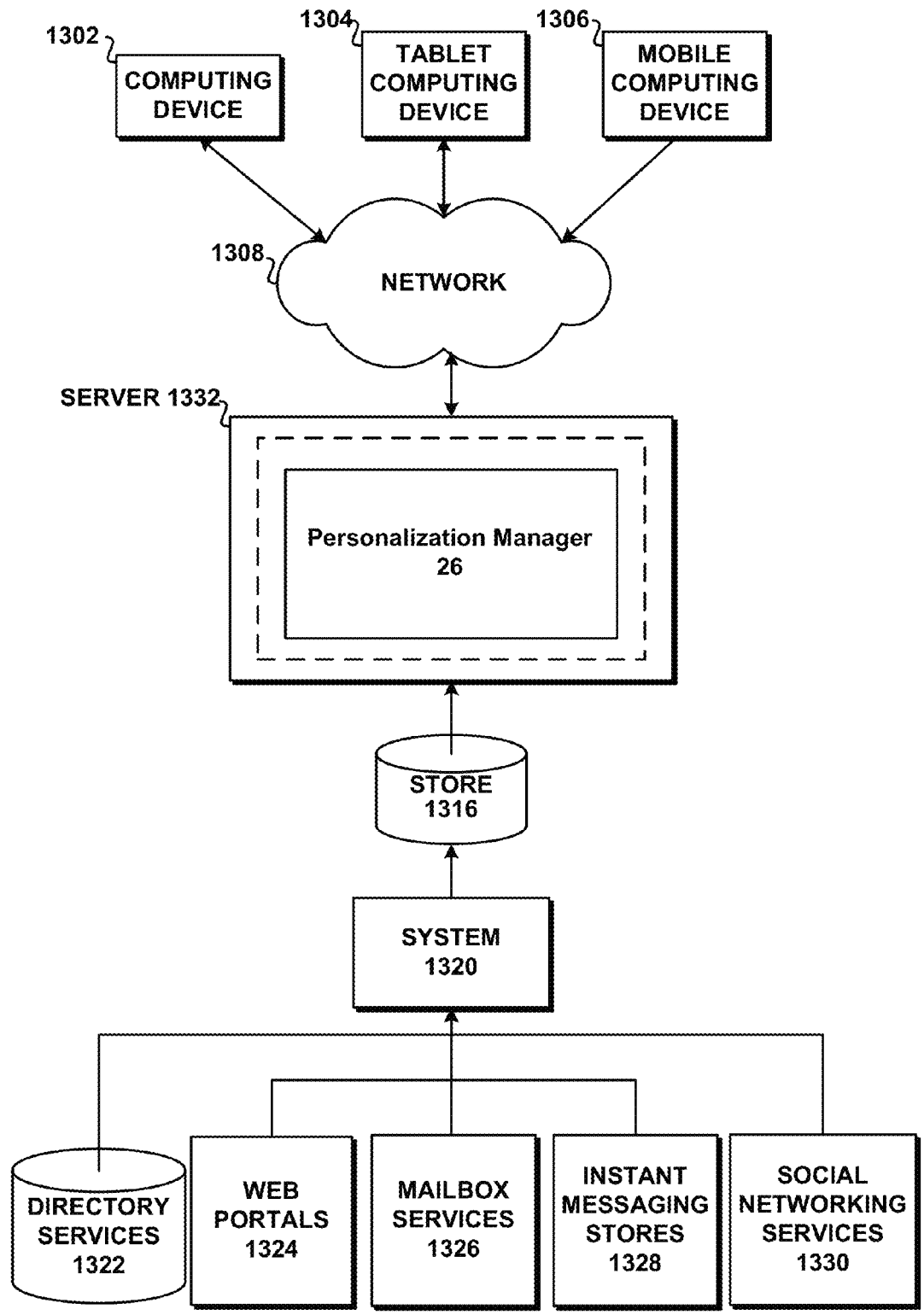

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a personalization manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 6 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a suitable mobile computing environment, for example, a mobile telephone, a smartphone, a tablet personal computer, a laptop computer, and the like, with which embodiments of the invention may be practiced. With reference to FIG. 7A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 7B is a block diagram illustrating components of a mobile computing device used in one embodiment, such as the computing device shown in FIG. 7A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the personalization manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 5B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 8 illustrates an exemplary system architecture.

Components managed via the personalization manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to using and determining variations. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for speech personalization, comprising:
   receiving an utterance from a device;
   estimating an i-vector using the utterance;
   estimating hyperparameters for the utterance;
   training a Gaussian Mixture Model (GMM) using the i-vectors extracted from a collection of utterances recorded from the device;
   applying unsupervised constrained maximum likelihood linear regression (CMLLR) to the utterance; and
   assigning the utterance to a cluster in the GMM.

2. The method of claim 1, further comprising estimating a residual noise for the utterance.

3. The method of claim 1, further comprising training a Universal Background Model (UBM) using the utterance received from the device.

4. The method of claim 1, further comprising receiving additional utterances from the device and estimating the i-vector and estimating hyperparameters until convergence.

5. The method of claim 1, wherein assigning the utterance to the cluster in the Gaussian Mixture Model (GMM) comprises assigning the utterance to a cluster with the closest centroid in the GMM.

6. The method of claim 1, further comprising when performing Automatic Speech Recognition (ASR) using the estimated i-vectors, estimated hyperparameters and an estimated residual noise determined from the utterances received from the device in a UBM and a GMM.

7. The method of claim 1, further comprising receiving the utterance from at least one of a gaming device; a tablet; and a smartphone.

8. The method of claim 1, further comprising training a Universal Background Model using utterances consisting of utterances received from the device.

9. A computing device storing computer-executable instructions for speech personalization, comprising:
   receiving an utterance from a device;
   estimating an i-vector using the utterance;
   estimating a residual noise for the utterance;
   estimating hyperparameters for the utterance;
   training a Gaussian Mixture Model (GMM) using the i-vectors extracted from a collection of utterances recorded from the device;
   applying unsupervised constrained maximum likelihood linear regression (CMLLR) to the utterance; and
   assigning the utterance to a cluster in the GMM.

10. The computing device of claim 9, further comprising training a Universal Background Model (UBM) using the utterance received from the device.

11. The computing device of claim 9, further comprising receiving additional utterances from the device and estimating the i-vector and estimating hyperparameters until convergence.

12. computing device of claim 9, further comprising assigning the utterance to a cluster in the Gaussian Mixture Model (GMM).

13. The computing device of claim 12, wherein assigning the utterance to the cluster in the Gaussian Mixture Model (GMM) comprises assigning the utterance to a cluster with the closest centroid in the GMM.

14. The computing device of claim 9, further comprising when performing Automatic Speech Recognition (ASR) using the estimated i-vectors, estimated hyperparameters and an estimated residual noise determined from the utterances received from the device in a UBM and a GMM.

15. The computing device of claim 9, further comprising training a Universal Background Model using utterances consisting of utterances received from the device.

16. A system for speech personalization, comprising:
   a processor and memory;
   an operating environment executing using the processor; and
   a personalization manager that is configured to perform actions comprising:
   receiving an utterance from a device;
   estimating an i-vector using the utterance;
   estimating a residual noise for the utterance;
   estimating hyperparameters for the utterance;
   training a Gaussian Mixture Model (GMM) using the estimated i-vectors from a collection of utterances received from the device;
   training a Universal Background Model (UBM) using the utterance received from the device;
   applying unsupervised constrained maximum likelihood linear regression (CMLLR) to the utterance; and
   assigning the utterance to a cluster in the GMM.

17. The system of claim 16, further comprising receiving additional utterances from the device and estimating the i-vector and estimating hyperparameters until convergence.

18. The system of claim 16, further comprising assigning the utterance to a cluster with the closest centroid in the Gaussian Mixture Model (GMM).

19. The system of claim 16, further comprising training a Universal Background Model using utterances consisting of utterances received from the device.

* * * * *